J. BRUCKNER.

Improvement in Preserving Animal and Vegetable Substances.

No. 130,474.        Patented Aug. 13, 1872.

Witnesses
O. E. Duffy
Alonzo Hughes

Inventor
Joseph Bruckner
By James L. Norris
Atty.

UNITED STATES PATENT OFFICE.

JOSEPH BRUCKNER, OF NEW ORLEANS, LOUISIANA, ASSIGNOR OF ONE-FOURTH OF HIS RIGHT TO M. GALODY, OF WASHINGTON, D. C.

IMPROVEMENT IN PRESERVING ANIMAL AND VEGETABLE SUBSTANCES.

Specification forming part of Letters Patent No. 130,474, dated August 13, 1872.

*To all whom it may concern:*

Be it known that I, JOSEPH BRUCKNER, of New Orleans, Louisiana, have invented a new and useful Method of Preserving Animal and Vegetable Substances; and I do hereby declare that the following is a full, clear, and exact description of the same.

My invention relates to the improvement of the method of preserving animal and vegetable substances by the use of sulphuric acid; and consists in the art of preparing the sulphurous-acid gas, and so impregnating the substance with it as to make its effects lasting.

I have devised the following method as the simplest and most reliable in effect, and will subsequently point out its advantages over all other methods now used for preserving meats, skins, fruits, &c.

I now describe the appliances to be used, together with all that is necessary to a full understanding of my improved method, and show how it may be practically carried out.

Figure 1:
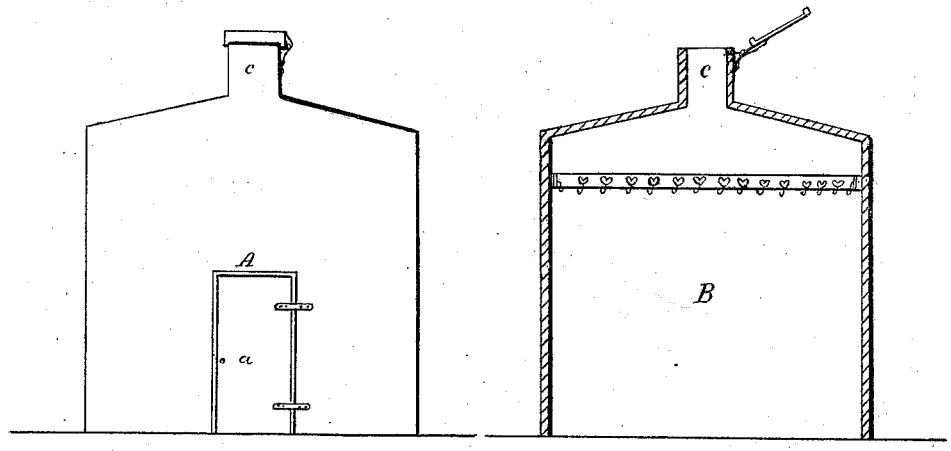

Referring to the accompanying drawing, Figure 1 is an air-tight chamber for the reception of the substances to be preserved. It may be constructed of wood or any other material, and painted inside with wood-tar for better preservation. It is provided with suitable fixtures for suspending the substances intended for preservation at such distance apart as to expose their whole surface to the action of the gas.

Figure 2:
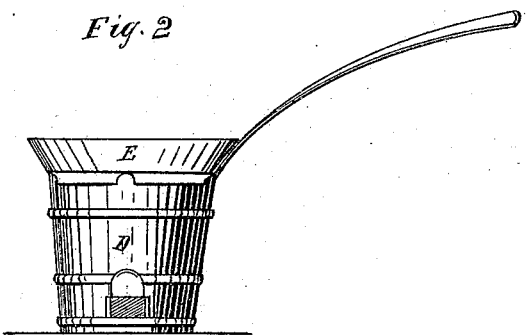

Letter A is a door, so arranged as to be air-tight when closed; and letter C, a ventilator, to be closed before and during the operation of the process. Letter D, Fig. 2, is an ordinary furnace for burning charcoal; and letter E, a cast-iron pan, placed on the furnace, and used as hereinafter described. After the substances to be preserved are suspended in the chamber, and the ventilator is closed, the furnace of burning charcoal is placed in the chamber a short distance from the suspended substances. Where the chamber is large the number of furnaces and pans may be increased. The pan is then placed on the fire, heated, and charged with not less than two pounds of sulphur for every hundred cubic feet of space. A greater quantity of sulphur may be used without objection. The sulphur soon melts, when I ignite it and close the door instantly, and leave the chamber closed from five to six hours, that length of time being sufficient to insure preservation. I then open the door and ventilator, permitting the gas to escape, when entrance can be made, and the substances, now preserved, can be removed at pleasure.

I am aware that sulphurous acid has been used before for preserving animal and vegetable substances, being prepared by burning sulphur on a hot plate, and conducting the fumes from a retort through pipes to an air-tight chamber; but in all processes or methods heretofore used the fumes of the sulphur will only combine with substances in a limited degree, and for this reason they are ineffective.

When sulphurous acid is prepared on a hot plate, and conducted from a retort through pipes into the preserving-chamber, its cooling nature creates a tendency to thicken the fumes, and causes loss of volatility before it reaches the substances. Consequently its preservative effect is impaired, and is not lasting. Whenever sulphur is burned where there is a circulation of air it unavoidably attracts oxygen, and this damaging agent cannot be excluded by the use of a retort, and no air-pump can effectually expel it from the chamber. Consequently, the preservative properties of the sulphurous-acid gas are greatly impaired.

In my method of using sulphurous-acid gas for preservative purposes I impregnate the substances with the gas unimpaired in strength by direct means, creating a vigorous combustion of the sulphur within the air-tight chamber, thus producing a high degree of volatility, and impregnating the substances before any condensation can commence, enforcing complete penetration, and making its effect lasting. The combustion of the sulphur in the closed chamber is more active in destroying the oxygen contained therein, both in the confined air and substances, than by any other means, and will not cease until the last particle of oxygen is destroyed, and the attraction of oxygen during the combustion is avoided.

To obtain the improvement making the process perfect, as set forth in the foregoing description, I have devised the production of the sulphurous-acid gas within the immediate reach of the substances. By heating the sulphur before ignition, I produce a more active and vigorous combustion, and the whole process is performed within the air-tight chamber.

I produce the combustion of the sulphur to the highest degree of volatility, and while the fumes are in that state they impregnate the substances more thoroughly than by any other method. By so doing I destroy, with the acid, the oxygen in the chamber as well as in the substances, and prevent the combination of the oxygen with the gas; whereas, by other methods the fumes passing through the pipes weaken the properties of the gas. The combustion in the heated furnace is produced for the purpose of keeping the sulphur entirely in vigorous combustion; otherwise the sulphur would extinguish too soon, and its action be rendered nugatory. By the old method the fumes are too thick to penetrate the substances; whereas the gas produced by this system is so volatile that its effect on the substances is perfect. In all such cases the oxygen is only partially destroyed by air-pumps; whereas, with my system the gas expels the same entirely and most effectively.

Having thus described all that is necessary to a full understanding of my invention, what I claim to be new, and desire to secure by Letters Patent, is—

Preserving animal and vegetable substances by exposing the same, in the fumigating-chamber, to sulphurous-acid gas, said sulphur being heated before ignition, substantially as described, for the purpose set forth.

JOSEPH BRUCKNER.

Witnesses:
AUG. B. WHEELER,
CHAS. STRINGER.